(12) United States Patent
Hamasaki et al.

(10) Patent No.: US 8,095,160 B2
(45) Date of Patent: Jan. 10, 2012

(54) INTERMEDIATE STATION AND METHOD FOR FACILITATING HANDOVER IN A MULTI-HOP COMMUNICATION SYSTEM

(75) Inventors: Ryutaro Hamasaki, Higashikurume (JP); Masahito Asa, Tokyo (JP); Tetsu Ikeda, Kanagawa (JP); Mohsin M Mollah, Chiba (JP)

(73) Assignee: Motorola Solutions, Inc., Schaumburg, IL (US)

( * ) Notice: Subject to any disclaimer, the term of this patent is extended or adjusted under 35 U.S.C. 154(b) by 542 days.

(21) Appl. No.: 11/557,294

(22) Filed: Nov. 7, 2006

(65) Prior Publication Data

US 2008/0108350 A1 May 8, 2008

(51) Int. Cl.
*H04B 15/00* (2006.01)
(52) U.S. Cl. ......... 455/502; 455/436; 370/315; 370/350
(58) Field of Classification Search .................. 455/222, 455/436, 10, 16, 502, 316; 370/318, 335, 370/338, 350, 315
See application file for complete search history.

(56) References Cited

U.S. PATENT DOCUMENTS

| | | | |
|---|---|---|---|
| 7,184,703 B1 * | 2/2007 | Naden et al. | 455/10 |
| 2007/0019598 A1 * | 1/2007 | Prehofer | 370/338 |
| 2007/0249347 A1 * | 10/2007 | Saifullah et al. | 455/436 |
| 2007/0293224 A1 * | 12/2007 | Wang et al. | 455/436 |

OTHER PUBLICATIONS

Lu et al. (IEEExplorer, Geneva conference record 1993, vol. 2, May 23-26, 1993 pp. 1005-1009 v2).*

* cited by examiner

*Primary Examiner* — Kamran Afshar
*Assistant Examiner* — Manpreet Matharu
(74) *Attorney, Agent, or Firm* — Kenneth A. Haas; Anthony P. Curtis; Daniel R. Bestor

(57) ABSTRACT

An intermediate station and method for facilitating handover in a multi-hop communications system is disclosed. The method may include receiving a handover trigger, finding a target station to receive handover, determining whether the handover requires a timing change, wherein if it is determined that a preamble and broadcast timing change for one or more downstream stations is required, estimating when the handover will take place, instructing the one or more downstream stations to resynchronize, and performing the handover to the target station.

20 Claims, 3 Drawing Sheets

INTERMEDIATE STATION AND METHOD FOR FACILITATING HANDOVER IN A MULTI-HOP COMMUNICATION SYSTEM

BACKGROUND OF THE INVENTION

1. Field of the Invention

The present invention relates to mobile communication systems.

2. Introduction

A mobile relay station (MRS) is a relay station that is capable of handover between base stations (BS) (or relay stations for above 3-hops). It is usually attached to a public transportation system (e.g., a bus, train, etc.) and may relay information to/from mobile stations (MSs) inside the public transportation. When MRS makes handover from BS1 to BS2, MRS should take care for MSs under communication via the MRS. Due to handover process of MRS, synchronization between MRS and MSs may be lost. It leads to a communication disruption.

If MS makes handover as same as conventional cellular system, it would be no problem for MS to prepare handover process and make a decision. When RS makes handover, the RS must be cognizant of MSs under communication via the RS. Synchronization could be an issue between RS and MSs when RS makes handover between BSs. A problem may occur in the change of timing of preamble and broadcast message that is transmitted from RS to MSs. If the MSs lose synchronization, it takes time to recover it. During the recovery process, communication with MSs may be suspended. The synchronization process of MSs consumes radio resources to reestablish the synchronization. If there are many MSs under the RS, the overhead amounts may be large.

If the RS can maintain the same preamble and broadcast timing when the RS makes a handover between BSs, this problem does not occur. However, it would be difficult to assign same preamble and broadcast timing after the RS has completed the handover as before the handover because preambles and following broadcasts may interfere. The information exchange between BSs via the backbone network would be too complicated to be performed in a practical manner.

SUMMARY OF THE INVENTION

An intermediate station and method for facilitating handover in a multi-hop communications system is disclosed. The method may include receiving a handover trigger, finding a target station to receive handover, determining whether the handover requires a timing change of preamble and broadcast, wherein if it is determined that a preamble and broadcast timing change for one or more downstream stations is required, estimating when the handover will take place, instructing the one or more downstream stations to resynchronize, and performing the handover to the target station.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, apparatus, and other embodiments that relate to the basic concepts of the invention.

Figure 1:
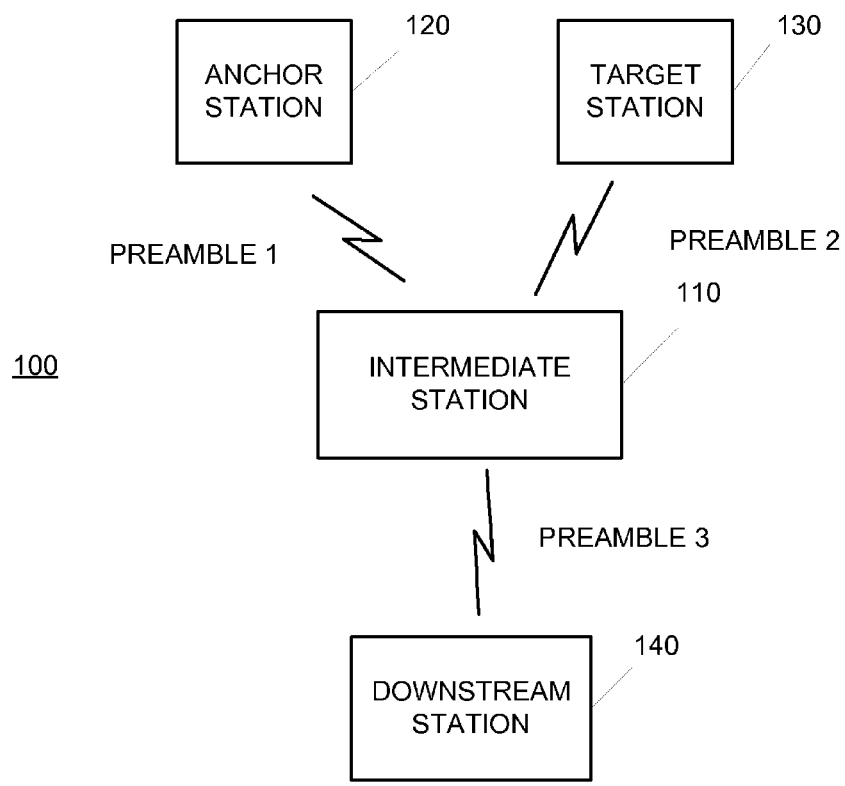
FIG. 1 illustrates an exemplary diagram of a communications network in accordance with a possible embodiment of the invention.

FIG. 1 illustrates an exemplary diagram of a communications network 100 in accordance with a possible embodiment of the invention. In particular, the communications network 100 may include intermediate station 110, anchor station 120, target station 130, and downstream station 140. One of skill in the art may appreciate that intermediate station 110, anchor station 120, target station 130, and downstream station 140 may represent any communications station that may exist in a mobile communications network, including a base station, a relay station, and a mobile relay station. The communications network 100 may represent any communications network or combination of communications networks known to one of skill in the art, including a mobile communications network or cellular communications network.

The anchor station 120 communicates through the intermediate station 110 to downstream stations 140 or devices, such as cell phone terminals. The stations send messages in that contain at least in part, preamble and broadcast portions. As shown, anchor station 120 sends preamble 1 and the target station 130 sends preamble 2 to the intermediate station 110, and the intermediate station 110 sends preamble 3 to the downstream station 140. The sending of these preamble and broadcast messages must be orthogonal or robust enough in order for the communications to be established and maintained. Otherwise, interference may occur and the communication link may be dropped.

Figure 2:
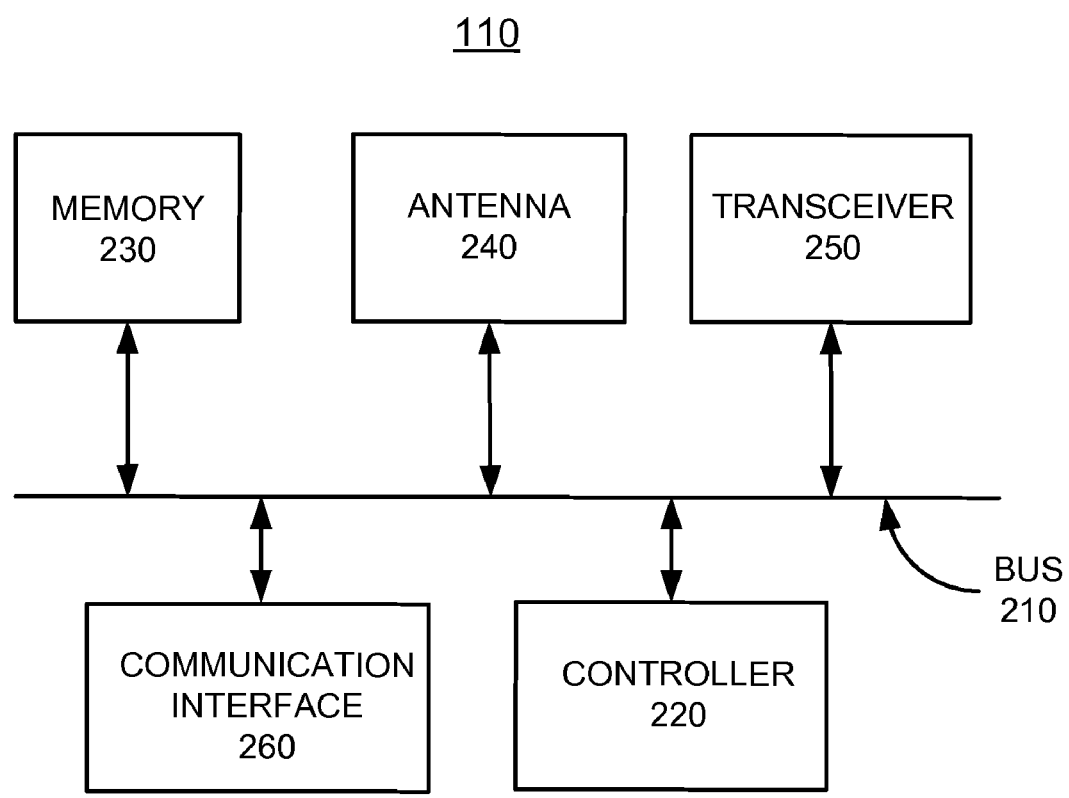
FIG. 2 illustrates a block diagram of an exemplary intermediate station in accordance with a possible embodiment of the invention.

FIG. 2 illustrates an exemplary intermediate station 110 which may implement one or more modules or functions of the communications handover process shown below in FIG. 4. The exemplary intermediate station 110 may include a bus 210, a controller 220, a memory 230, an antenna 240, a transceiver 250, and a communication interface 260. Bus 210 may permit communication among the components of the intermediate station 110.

Controller 220 may include at least one conventional processor or microprocessor that interprets and executes instructions. Memory 230 may be a random access memory (RAM or another type of dynamic storage device that stores information and instructions for execution by processor 220. Memory 230 may also store temporary variables or other intermediate information used during execution of instructions by processor 320. Memory 230 may also include a read-only memory (ROM which may include a conventional ROM device or another type of static storage device that stores static information and instructions for processor 220. Memory 230 may include a storage device that stores any type of media, such as, for example, magnetic or optical recording media and its corresponding drive.

Transceiver 250 may include one or more transmitters and receivers. The transceiver to 250 may include sufficient functionality to interface with any network or communications station and may be defined by hardware or software in any manner known to one of skill in the art. The transceiver 250 may be operable to support communication activities and links within the network 100. The controller 220 is cooperatively operable with the transceiver 250 to support operations within the communications network 100.

Communication interface 260 may include any mechanism that facilitates the intermediate station 110 to communicate via the communications network 100. For example, communication interface 260 may include a modem. Alternatively, communication interface 260 may include other mechanisms for assisting the transceiver 250 in communicating with other devices and/or systems via wireless connections. In some implementations of the network environment 100, communication interface 260 may not be included in the exemplary intermediate station 110 when the communications handover process is implemented completely within the communications network 100.

The intermediate station 100 may perform such functions in response to processor 220 by executing sequences of instructions contained in a computer-readable medium, such as, for example, memory 230, a magnetic disk, or an optical disk. Such instructions may be read into memory 230 from another computer-readable medium, such as a storage device or from a separate device via communication interface 260.

The communications system 100 and the intermediate station 110 illustrated in FIGS. 1 and 2 and the related discussion are intended to provide a brief, general description of a suitable computing environment in which the invention may be implemented. Although not required, the invention will be described, at least in part, in the general context of computer-executable instructions, such as program modules, being executed by the intermediate station 110, such as a communications server, or general purpose computer. Generally, program modules include routine programs, objects, components, data structures, etc. that perform particular tasks or implement particular abstract data types. Moreover, those skilled in the art will appreciate that other embodiments of the invention may be practiced in communication network environments with many types of communication equipment and computer system configurations, including cellular devices, mobile communication devices, personal computers, handheld devices, multi-processor systems, microprocessor-based or programmable consumer electronics, and the like.

For illustrative purposes, the communication handover process will be described below in relation to the block diagrams shown in FIGS. 1 and 2.

Figure 3:
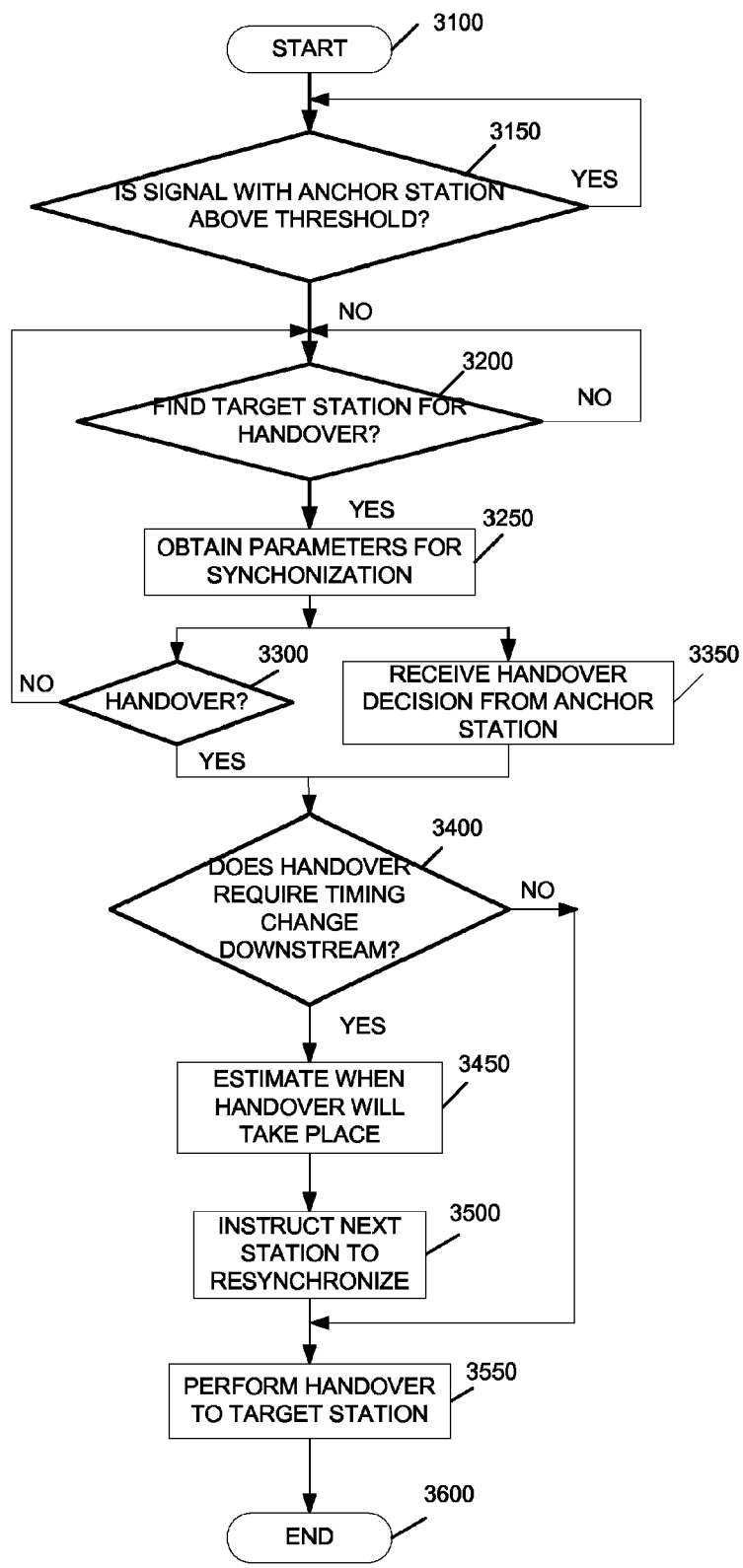
FIG. 3 is an exemplary flowchart illustrating one possible mobile communications handover process in accordance with one possible embodiment of the invention.

FIG. 3 is an exemplary flowchart illustrating some of the steps associated with a communication handover process in accordance with another possible embodiment of the invention. The process begins at step 3100 and continues to step 3150 where the intermediate station 110 determines whether the signal being received from an anchor station 120 upstream is above a threshold or where the anchor station 120 determines whether the signal being received from an intermediate station 110 upstream is above a threshold based on a measurement report from the intermediate station 110 to the anchor station 120. The threshold may be predetermined or computed using any algorithm known to one of skill in the art. If the intermediate station 110 or the anchor station determines that the signal from the anchor station 120 is at or above the threshold, the process then returns to step 3150. This step may represent a periodic monitoring process. Although not shown, time delays in the monitoring process may be implemented in this process within the spirit and scope of the invention.

If the intermediate station 110 determines that the signal from the anchor station is below the threshold, the intermediate station 110 attempts to find another upstream station in which to hand over communications. If the intermediate station 110 cannot find another station with which to perform the handover, the process returns to step 3200 until a target station 130 is found. If the intermediate station 110 finds a target station 130 in which to hand over communications, then at step 3250, the intermediate station 110 obtains parameters for synchronization concerning the timing of the preamble and broadcast messages. The preamble and broadcast message timing of all stations involved in the communications chain must be synchronized so that interference does not take place.

If the anchor station 120 determines that the signal from the intermediate station is below the threshold, the anchor station forces the intermediate station 110 to attempt to find another upstream station in which to hand over communications. If the intermediate station 110 cannot find another station with which to perform the handover, the process returns to step 3200 until a target station 130 is found. If the intermediate station 110 finds a target station 130 in which to hand over communications, then at step 3250, the intermediate station 110 obtains parameters for synchronization concerning the timing of the preamble and broadcast messages. The preamble and broadcast message timing of all stations involved in the communications chain must be synchronized so that interference does not take place.

The decision for conducting the handover of communications may be conducted in at least two different ways. At step 3300, the intermediate station 110 may decide to conduct the handover. If the intermediate station 110 decides not to conduct the handover, the process returns to step 3200. Alternatively, at step 3350, the intermediate station 110 may receive handover instructions from an anchor station upstream, for example.

In either case, once a favorable handover decision has been made, the process goes to step 3400 where the intermediate station 110 determines whether the handover requires any of the downstream stations to perform a preamble and broadcast message timing change. If the intermediate station 110 determines that the handover does not require downstream stations to perform preamble and broadcast message timing changes, then at step 3550, the intermediate station 110 performs the handover to the target station. The process then goes to step 3600, and ends.

If the intermediate station 110 determines that the handover requires downstream stations to perform preamble and broadcast message timing changes, then at step 3450, the intermediate station 110 estimates when the handover will take place. At step 3500, the intermediate station 110 instructs one or more of the downstream stations to resynchronize. At step 3500, the instruction may include the information to imply when the resynchronization should be started. At step 3550, the intermediate station 110 performs the handover to the target station. The process then goes to step 3600, and ends.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the intermediate station 110 in FIGS. 1 and 2 each processing the content in various possible ways. It does not necessarily need to be one system used by all end users. Accordingly, the appended claims and their legal equivalents should only define the invention, rather than any specific examples given.

We claim:

1. A method for facilitating handover of an intermediate station, communicatively coupled to one or more downstream stations, from a source station to a target station in a multi-hop communications system, the method comprising:
   receiving, at the intermediate station, a handover trigger;
   finding, at the intermediate station, a target station to receive handover;
   determining, at the intermediate station, whether the handover of the intermediate station requires a preamble and broadcast timing change for one or more of the downstream stations;
   responsive to determining that handover of the intermediate station requires the preamble and broadcast timing to change:
      estimating, at the intermediate station, when the handover to the target station will take place; and
      instructing, by the intermediate station, the one or more downstream stations to resynchronize in view of the preamble and broadcast timing change; and
   the intermediate station performing the handover to the target station.

2. The method of claim 1, wherein one or more of the downstream stations are one of a relay station, and a mobile relay station.

3. The method of claim 1, further comprising:
   determining, at the intermediate station, whether a signal from the source station has a signal strength below a predetermined threshold, and if so, triggering the handover trigger.

4. The method of claim 1, wherein the source station determines whether a signal strength of a signal from the intermediate station is below a predetermined threshold, and if so, the source station triggering the handover trigger in the intermediate station.

5. The method of claim 1, further comprising:
   the intermediate station obtaining parameters for the resynchronization of the one or more downstream stations and providing the parameters to the one or more downstream stations.

6. The method of claim 1, further comprising:
   the intermediate station determining if the handover to the target station has taken place.

7. The method of claim 1, further comprising:
   the intermediate station receiving handover instructions from the source station.

8. The method of claim 1, wherein the handover trigger is triggered based on signal strength.

9. The method of claim 1, wherein the instruction to one or more downstream stations to resynchronize includes information reflecting the estimate of when the handover to the target station will take place and instructs the one or more downstream stations to start resynchronization at that time.

10. An intermediate station, communicatively coupled to one or more downstream stations, that facilitates handovers from a source station to a target station in a multi-hop communications system, the intermediate station comprising:
    a transceiver that sends and receives communications; and
    a controller coupled to the transceiver configured to:
       receive a handover trigger,
       find a target station to handover to,
       determines whether the handover requires a preamble and broadcast timing change for one or more of the downstream stations,
       responsive to a determination that the handover does require the preamble and broadcast timing to change, estimates when the handover to the target station will take place, and instruct the one or more downstream stations to resynchronize in view of the preamble and broadcast timing change, and
       performs the handover to the target station.

11. The intermediate station of claim 10, wherein one or more of the downstream stations are one of a relay station, and a mobile relay station.

12. The intermediate station of claim 10, wherein the controller is further configured to determine whether a signal from the source station has a signal strength below a predetermined threshold, and if so, to trigger the handover trigger.

13. The intermediate station of claim 10, wherein the controller is further configured to trigger the nadover trigger in response to receiving a signal from the source station as a result of the source station determining that a signal from the intermediate station has a signal strength below a predetermined threshold.

14. The intermediate station of claim 10, wherein the controller is further configured to obtains parameters for the resynchronization of the one or more downstream stations and to provide the parameters to the one or more downstream stations.

15. The intermediate station of claim 10, wherein the controller is further configured to determine if the handover to the target station has taken place.

16. The intermediate station of claim 10, wherein the controller is further configured to receives handover instructions from the source station.

17. The intermediate station of claim 10, wherein the handover trigger is triggered based on signal strength.

18. The intermediate station of claim 10, wherein the instruction to the one or more downstream stations to resynchronize includes information reflecting the estimate of when the handover to the target station will take place and thus when the resynchronization should be started and instructs the one or more downstream stations to start resynchronization at that time.

19. A method for facilitating handover of an intermediate station, communicatively coupled to one or more downstream stations, from a source station to a target station in a multi-hop communications system, the method comprising:
  determining, at the intermediate station, whether a strength of a signal received from the source station is at or above a predetermined threshold, wherein if the strength is determined not to be at or above the threshold, a handover is triggered;
  finding, at the intermediate station, a target station to receive handover;
  determining, at the intermediate station, whether the handover of the intermediate station requires a broadcast timing change for one or more of the downstream stations;
  responsive to determining that handover of the intermediate station requires the broadcast timing change:
    estimating, at the intermediate station, when the handover to the target station will take place;
    instructing, by the intermediate station, the one or more downstream stations to resynchronize in view of the preamble and broadcast timing change; and
  the intermediate station performing the handover to the target station.

20. The method of claim 19, wherein the instruction to the one or more downstream stations to resynchronize includes information reflecting the estimate of when the handover to the target station will take place and instructs the one or more downstream stations to start resynchronization at that time.

* * * * *

UNITED STATES PATENT AND TRADEMARK OFFICE
CERTIFICATE OF CORRECTION

PATENT NO. : 8,095,160 B2
APPLICATION NO. : 11/557294
DATED : January 10, 2012
INVENTOR(S) : Hamasaki et al.

It is certified that error appears in the above-identified patent and that said Letters Patent is hereby corrected as shown below:

In the Claims:

In Column 6, Line 60, in Claim 10, delete "estimates" and insert -- estimate --, therefor.

In Column 6, Line 61, in Claim 10, delete "place," and insert -- place --, therefor.

In Column 7, Line 6, in Claim 13, delete "nadover" and insert -- handover --, therefor.

In Column 7, Line 21, in Claim 16, delete "receives" and insert -- receive --, therefor.

Signed and Sealed this
Twenty-ninth Day of October, 2013

Teresa Stanek Rea
*Deputy Director of the United States Patent and Trademark Office*